United States Patent
Suuronen et al.

(10) Patent No.: US 7,135,958 B1
(45) Date of Patent: Nov. 14, 2006

(54) PORTABLE CONTROLLER

(75) Inventors: Heikki Suuronen, Salo (FI); Ilkka Ratamo, Vaskio (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/869,542

(22) PCT Filed: Dec. 23, 1999

(86) PCT No.: PCT/IB99/02082

§ 371 (c)(1),
(2), (4) Date: Oct. 5, 2001

(87) PCT Pub. No.: WO00/41047

PCT Pub. Date: Jul. 13, 2000

(30) Foreign Application Priority Data

Dec. 31, 1998 (GB) .................... 9828877.2

(51) Int. Cl.
 G05B 19/00 (2006.01)
 G06F 7/00 (2006.01)
 G06K 19/00 (2006.01)
 G08B 29/00 (2006.01)
 H04B 1/00 (2006.01)

(52) U.S. Cl. .................... 340/5.62; 340/5.6; 340/5.7

(58) Field of Classification Search ............ 340/5.61, 340/5.22–5.26, 5.64, 5.5, 5.62, 5.6, 5.7, 825.69, 340/426.13, 825.72; 165/202, 266, 42; 455/89, 90, 151.1, 352, 353; 307/10.1, 10.7, 307/9.1, 10.4; 701/49, 1
See application file for complete search history.

(56) References Cited

U.S. PATENT DOCUMENTS

| | | | |
|---|---|---|---|
| 4,754,255 A * | 6/1988 | Sanders et al. ............ 307/10.4 |
| 4,916,441 A | 4/1990 | Gombrich | |
| 5,201,067 A * | 4/1993 | Grube et al. ............. 455/556.1 |
| 5,204,768 A | 4/1993 | Tsakiris et al. | |
| 5,309,351 A | 5/1994 | McCain et al. | |
| 5,412,377 A | 5/1995 | Evans et al. | |
| 5,517,187 A * | 5/1996 | Bruwer et al. ............. 340/5.26 |
| 5,535,844 A * | 7/1996 | Samford ................... 180/287 |
| 5,541,585 A * | 7/1996 | Duhame et al. ........... 340/5.62 |
| 5,668,591 A | 9/1997 | Shintani | |
| 5,712,625 A | 1/1998 | Murphy | |
| 5,791,407 A | 8/1998 | Hammons | |
| 5,808,374 A * | 9/1998 | Miller et al. ............... 307/10.1 |
| 5,937,065 A * | 8/1999 | Simon et al. ............... 380/262 |
| 6,133,847 A * | 10/2000 | Yang ..................... 340/825.22 |
| 6,208,388 B1 * | 3/2001 | Farleigh ..................... 348/705 |
| 6,359,661 B1 * | 3/2002 | Nickum ..................... 348/734 |
| 6,362,813 B1 | 3/2002 | Worn et al. | |

FOREIGN PATENT DOCUMENTS

EP       0013685       8/1980

(Continued)

*Primary Examiner*—Brian Zimmerman
*Assistant Examiner*—Nam Nguyen
(74) *Attorney, Agent, or Firm*—Banner & Witcoff, Ltd.

(57) ABSTRACT

An arrangement for configuring a device of a system by transferring control information from a removable controller thereto. The controller includes an input apparatus for receiving control information for configuring the device, a memory circuitry arranged to store and retrieve control information for configuring the device, and an output apparatus for transferring to the system retrieved control information for the device. The system includes apparatus for coupling with the output apparatus of the removable controller to transfer retrieved control information therefrom, and a controller arranged to configure the device in dependence upon the transferred control information.

61 Claims, 6 Drawing Sheets

FOREIGN PATENT DOCUMENTS

| | | |
|---|---|---|
| EP | 0262954 | 4/1988 |
| EP | 392872 | 10/1990 |
| EP | 0782117 | 7/1997 |
| GB | 2185840 | 7/1987 |
| GB | 2298070 | 8/1996 |
| WO | 9635152 | 11/1996 |

* cited by examiner

LOW POWER RF UNIT

US 7,135,958 B1…

PORTABLE CONTROLLER

BACKGROUND OF THE INVENTION

The present invention relates to the configuration of systems, such as vehicle management systems. In particular, the invention relates to a portable controller for configuring a system comprising one or more devices.

Electronically controlled devices are very common, and are becoming even more so.

Currently, the onus lies with the user of both electronically and manually controlled devices to adapt each device as he uses it. For example, when a driver gets into a vehicle, he generally adjusts at least the mirror and seat positions, and often also temperature/ventilation settings.

It would be desirable to reduce the burden placed on a user to adapt each device within a system when he employs that system. It would be desirable to adjust the devices of a system automatically when a user wishes to use that system, according to the user's predetermined preferences.

SUMMARY OF THE INVENTION

According to one aspect of the present invention, there is provided an arrangement for configuring a device of a system by transferring control information from a controller thereto, wherein the controller comprises: input means for receiving control information for configuring the device; memory circuitry arranged to store and retrieve control information for configuring the device; and output means for transferring to the system retrieved control information for the device; and wherein the system comprises: means for coupling with the output means of the controller to transfer retrieved control information to the system; and control.

The user can carry his controller, so that he can readily alter the configuration of devices of a system as desired.

The system may comprise a plurality of devices. In this event, the system may only comprises a single control means arranged to configure the device in dependence upon the control information transferred from the controller, thus eliminating the need for a plurality of different user interfaces. In one embodiment, each device is configured in dependence upon control information transferred by the controller. Advantageously, all the devices are reconfigured in a single step, thus simplifying the operation by the user. Alternatively, if desired, the user can manually select which of the devices are to be reconfigured.

The memory circuitry may store and retrieve control information corresponding to the controller user' personal preferences. In this manner, the user can carry his preferences between different systems, thus improving the ease with which systems can be configured for him.

Optionally, the memory circuitry may store and retrieve information identifying a particular system so that the control information only configures the device or devices of that particular system. This enables the controller to be used to provide system security. For example, in a preferred embodiment, the system is a vehicle control system, and comprises devices such as an alarm, an immobiliser, and door/boot locks. Other devices which may be provided as part of a vehicle management system include a temperature/ventilation controller, an engine management device, and servicing interface device.

The removable controller may be removable from the environment of the system, and may automatically reconfigure system devices when it enters the environment of the system. Optionally, the removable controller is a handportable radio device.

According to another aspect of the present invention, there is provided a controller removable from a system for storing control information for a system and for configuring the device of a system by transferring control information to the system, comprising: input means for receiving control information for configuring the device; memory circuitry arranged to store control information for configuring the device and to retrieve control information associated with a device; and output means for transferring to the system, retrieved control information associated with the device. It may also have the optional features mentioned above.

BRIEF DESCRIPTION OF THE DRAWINGS

Embodiments of the present invention will now be described, by way of example, with reference to the accompanying drawings, of which.

In the following like references refer to like elements.

DETAILED DESCRIPTION OF THE INVENTION

Figure 1:
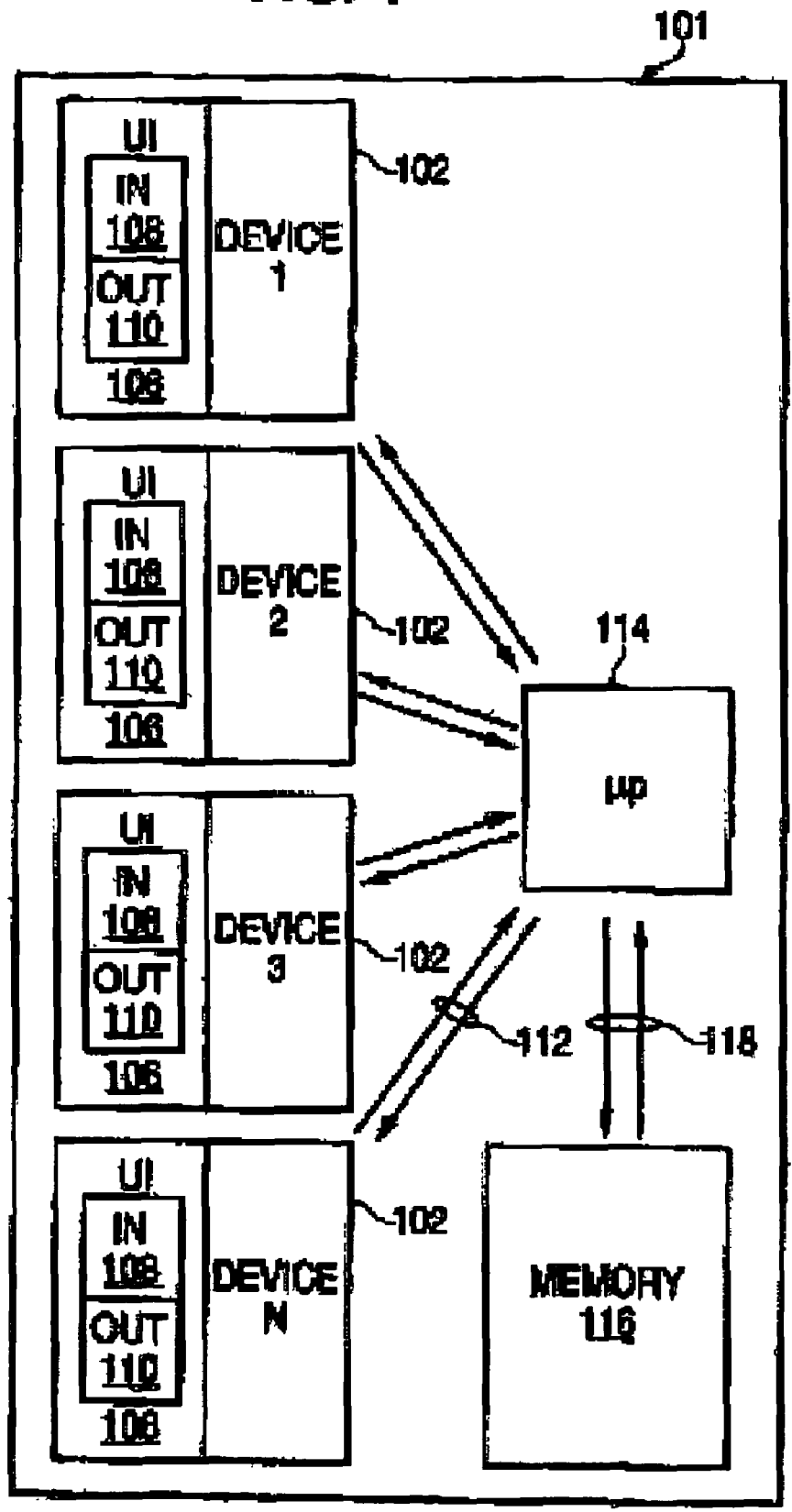
FIG. 1 schematically illustrates the components one type of device in the prior art.

FIG. 1 illustrates a vehicle management system 101 according to the prior art. The system comprises a plurality of devices 102, each having an associated user interface 106, together with a processor 114 and a memory 116. Generally, the user interfaces have an input interface for receiving input to the device 102 and/or an output interface for producing an output from the device. The processor is in communication with the interface 106 through an interconnect 112 and with the memory 116 through an interconnect 118. The memory 116 stores software which controls the interface 106 through the processor 114. The functionality of the device 102 and the interface 106 is controlled by the software. One device 102 may be any device which requires user interaction that is that requires an input from a user or provides an output to a user. A device may for example be a climate controller for controlling a vehicle heating/ventilation system. Such a controller may comprise a temperature controller for setting the temperature of the air passing through the interior of the vehicle, a fan controller for setting the fan speed to provide the desired air flow, and mode controller for controlling the direction of air flow. The output interface 110 may include vents at various positions within the vehicle, such as at the centre and edges of the dash, bottom of the windscreen and near the floor. Another device 102 may be a car audio system. In this case, the input interface may comprise a controller for selecting the radio channel, volume, tone, balance and for turning the device on and off. The output may include a pair of loudspeakers.

Figure 2:
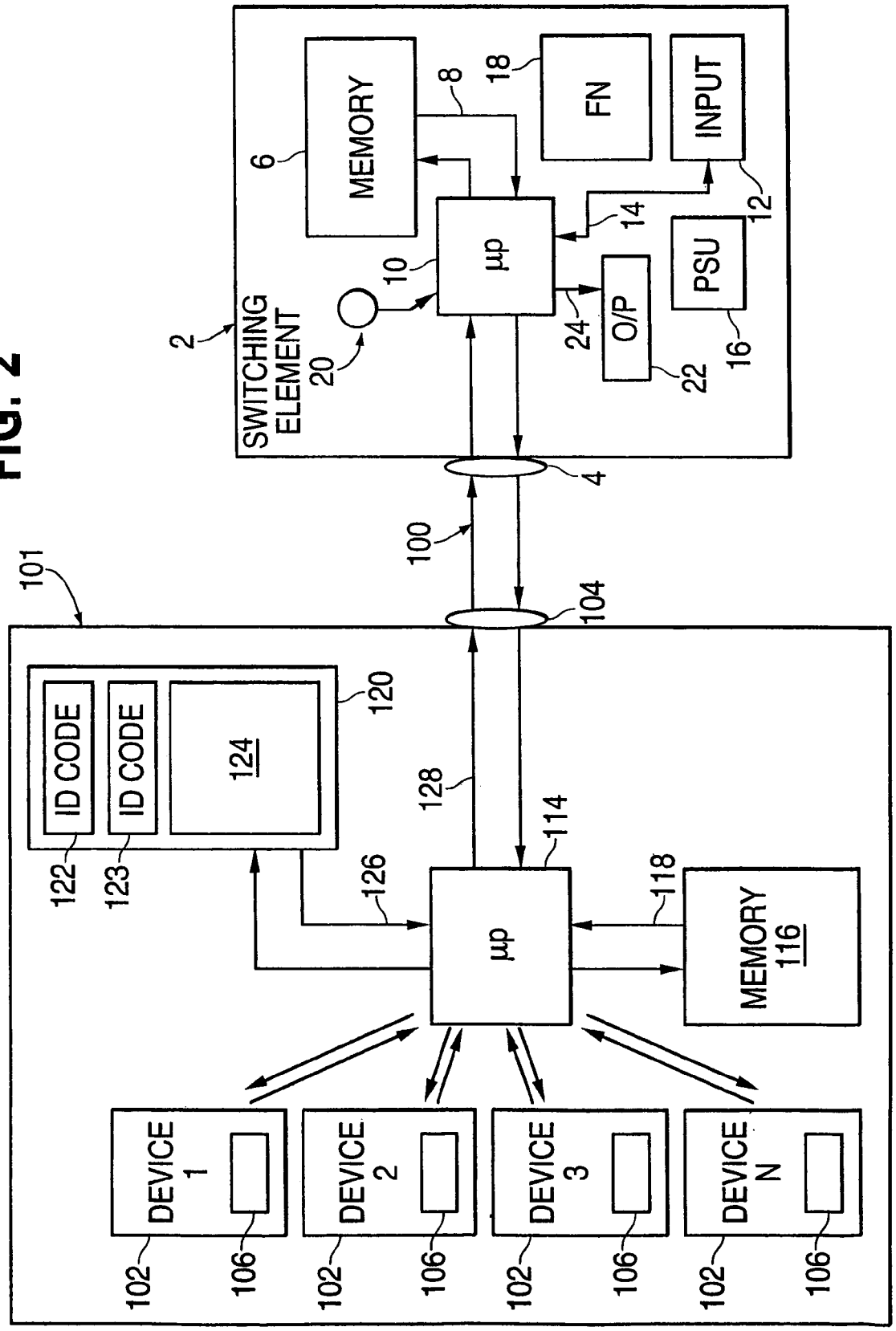
FIG. 2 schematically illustrates the components of a system and a controller, according to one embodiment of the present invention.

FIG. 2 illustrates an adapted vehicle management system 101 and a portable controller 2 in accordance with one embodiment of the present invention. The adapted device is similar to the device 102 illustrated in FIG. 1 but has an additional memory 120 and a port 104. The port 104 is connected via interconnect 128 to the processor 114. The processor receives control information 100 from the portable controller 2 and supplies control information 100 to the portable controller 2 via the port 104 and interconnect 128. The additional memory 120 may in practice be a portion of the memory 116 that is attached to the processor 114 through interconnect 126. The additional memory 120 has a first portion 122 which stores an ID code which identifies the system 101, a second portion 123 which stores an ID code which identifies the device 102, and a third portion 124 which stores software. This software controls how the processor responds to control information received from the portable controller 2 and controls the control information provided by the processor 114 to the portable controller 2.

The portable controller 2 according to this embodiment has a processor 10, a memory 6 for storing control information, a switching element 20 for controlling the transfer of control information between the portable controller 2 and the device 102, a port 4 for supplying control information to and receiving control from the device 102, an output 22 for giving information to a user, an input 12 for receiving an input from a user, functional circuitry 18 and a power supply unit 16. The processor receives an input from the switching element, writes to and reads from the memory 6 via an interconnect 8, controls the input 12 and receives signals therefrom via interconnect 14 and controls the output 22 by signal 24. The functional circuitry 18 represents the circuitry necessary for the portable controller 2 to be able to perform other functions ancillary to the present invention. For example, the functional circuitry 18 may allow the portable device to be additionally used as a mobile phone or car phone handset. The power supply device 16 is a battery cell which supplies power to the other elements in the portable controller 2. The memory 6 is preferably some form of non-volatile memory which can be written to and read from. Electrically erasable programmable read-only memory (EEPROM or 'flash memory') is suitable.

The communication of control information between the device 102 and the portable controller 2 may be achieved by any suitable means. An electrical connection could be made between the port 104 and port 4. Alternatively, the ports could be radio transceivers with the control information being transmitted as radio waves between them. Such transmission would preferably be point to point as described in UK Patent Application No 9820860.6 filed 24$^{th}$ Sep. 1998, which describes a low power radio frequency communication scheme that could be used to effect communication between the controller 2 and a device 102 and the contents of this application are herewith included by reference. Another alternative would be to use Infra-Red (IR) transceivers as the ports 104 and 4 with the control information being transmitted as IR radiation between them.

Activation of the switching element 20 to a first position causes the processor 10 to enter a 'receiving mode' and activation of the element 20 to a second position causes the processor to enter a 'transmitting mode'. In the 'receiving mode' the processor 10 receives control information 100 from the device 102 and stores the control information in the memory 6. Typically the device will have been configured by a user to reflect their preferences before entering the receiving mode and the control information transferred identifies these preferences. In the 'transmitting mode' the processor sends the control information from the memory 6 of the portable controller 2 to the system 101. The control information identifies the user's preferences and the system 101 automatically re-configures its associated devices 102 to reflect these preferences.

On entering the receiving mode, the processor 10 sends a request to the system 101 for control information 100. This request is sent from port 4 to port 104. The processor 114 in the system 101 receives the request and enters a 'set-up' mode. The processor 114 under the control of the software in the memory 116 identifies the settings of the devices 102 which are user alterable and then identifies which of those settings differ from the default or factory pre-set settings that is those settings which have been altered by the user. These settings represent a set of altered or preferred settings. The processor 114 under the control of the software 116 may allow the user to identify preferences such as settings, software, applications or data which they wish to be available when the same or similar device is configured by the portable controller. These preferences represent a set of chosen settings. The control information 100 comprises information defining the user's preferences including the preferred settings and any chosen settings.

The user's preferences include the information for configuring the functionality or operation of one or more devices of the system.

The control information is transmitted with the ID code of the system and device(s). The ID codes identify the system and associated device(s) as a particular type. For example the first n significant bits (System ID) of the system ID code may identify the type of system e.g. vehicle management system. The next few significant bits (Model ID) may identify the manufacturer and model of vehicle, and the following bits may indicate the actual vehicle. Likewise, the first n significant bits (Device ID) may identify the type of device, (e.g. climate controller, car audio system, seat positioner, immobiliser etc), and the next few significant bits (Model ID) may identify the model employed. The control information and ID codes are sent from the device 102 to the portable controller 2. The processor 10 of the portable controller 2 identifies the ID codes and stores the control information in the memory 6. One way of storing the control information will now be described with reference to FIG. 3. The processor reserves a portion of the memory 6 as a look-up table. In this embodiment a portion has been reserved for a given system code 122. Similar portions would be provided for different systems. The processor translates the device ID code 123 into a starting address a in the memory 6 to which the control information including the preferred and any chosen settings will be written. The control information is written into the memory in an ordered fashion with the last bit occupying an address b. An entry is made in the look-up table comprising the device ID code 123, the starting address a, and the end address b. The control information is stored in two logical layers. The upper layer identifies the preference types A, B, C . . . and gives a pointer to the portion of the lower layer which stores the actual settings, applications, software or data which effect the preferences on a device 102. On successfully storing the control information, the processor returns an acknowledgement to the system 101 and provides a signal to the user via the output 22. A failure in the transfer process may also be indicated via the output 22.

It is preferable for the processor 114 in the system 101 to flag those preferences, which are common to devices of different systems with the same Device ID of the device ID code 123, in the control information before transmission to the portable controller 2. In this instance the processor will create two separate entries in the look-up table. One entry under the full ID code which identifies the memory area storing all the preferences and one entry under the Device ID which identifies the memory area storing only the flagged preferences. As the flagged preferences are a subset of the preferences it is not necessary to store the flagged preferences twice. Instead the two upper layers associated with the two different look-up table entries can point to the same part of the memory storing the flagged preferred settings.

Figure 3:
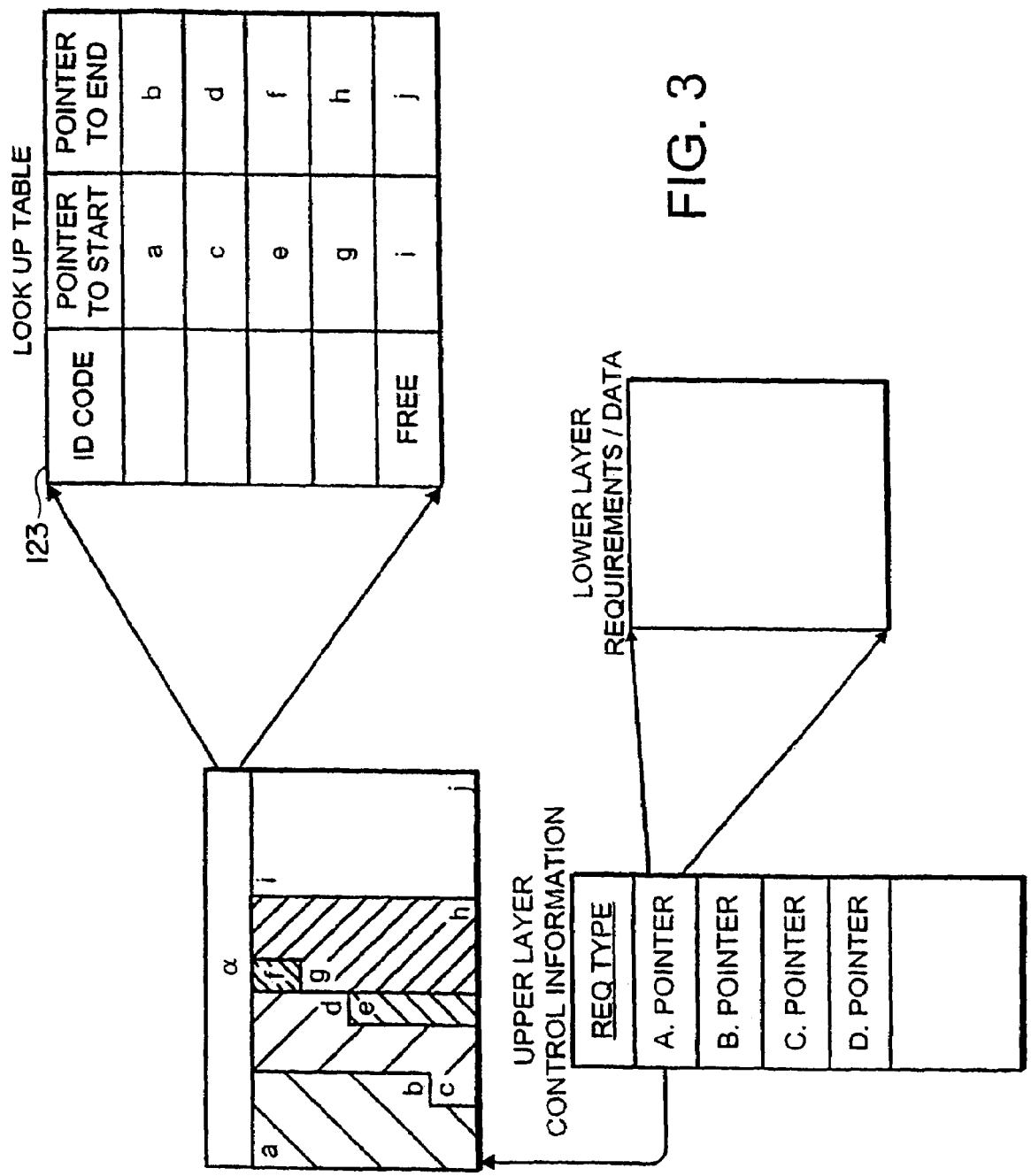
FIG. 3 illustrates a scheme for organising the storage of control information in the memory of the portable controller.

Referring to FIG. 3 the portions of the memory c–d, e–f, g–h each represent the portion of memory which stores the control information for different devices. The portion i–j is available memory.

On entering the 'transmitting mode' the portable controller 2 sends a transmission request to the system 101. In this embodiment, the processor 114 of the system 101 responds by reading the system ID code 123 and an ID code 123 corresponding to one of the devices 102 from memory 120 and transmitting it via port 104 to the portable controller 2. It also loads and executes the software for that device 102 in the portion 124 of memory 120. The processor 10 in the portable controller decodes the received ID codes 122, 123 identifying the system 101 and one of its associated devices 102. It then accesses the portion of the memory 6 storing the control information associated with that device identity and transmits the control information to the system 101 via port 4. The particular method of accessing the control information will be described with reference to FIG. 3. The processor 10 accesses the memory 6 and searches for the portion reserved, a, for the identified system, and reads the corresponding look-up table from the memory. The processor searches the look-up table for an entry having the same device ID code as the device ID code 123 received from the device 102. If an entry is found, the control information in the memory portion identified in the look-up table is read and transmitted to the device 102. If an entry is not found, the processor searches the look-up table for an entry having the same Device ID as that found in the first portion of the device ID code received from the system 101. If the second entry is found, the control information in the memory portion identified in the look-up table is read and transmitted to the system 101. If the second entry is not found, a null signal is sent to the system 101 instructing it to use the present settings or, alternatively, the default settings of the device and the user is informed via output 22.

The processor 114 under the control of the software in the memory 120 receives the control information or null signal from the portable device 2. It identifies what if any preferences need to be implemented. This may require identifying which settings need to be adjusted and determining how much they should be adjusted by. The processor 114 then controls the adjustment. It may also require storing any software, application or data received as a preference in memory 116 and allowing access thereto. On completion of implementing the preferences, the processor sends a signal back to the portable controller 2 indicating that the adjustment has been successfully completed. The portable controller 2 informs the user via the output 22.

Thus the device 102 is configured and any of the appearance, format, or functionality of any of the devices 102 are changed.

The transmission request need not be one corresponding to a particular device associated with a system. Instead, it may only request the system ID 122, in which case control information for all the associated devices 102 is transferred. Alternatively, it may only be a request for a device ID 123.

In the foregoing description of the receiving mode, the control information was described as being received from a device 102. However, as an alternative the preferred settings could be input directly into the portable controller via the input 12. Alternatively, a computer or other device could provide the control information to the port 4.

In the foregoing embodiment, the switching element is described as part of the portable controller 2. It could however be part of the device 102 instead.

It is desirable but not essential to have the output 22 keep the user informed of progress. The input 12 is optional. The PSU 16 is optional as power could be supplied from the system 101 via port 4. The functional circuitry 18 is optional.

For some applications it would be desirable for the device to be aware of when a user no longer requires it to be configured to his or her preferences for example when the user leaves the device. The device is able to check whether the portable controller is within a specified range of the device. This range could vary from device to device. When the user and portable device move outside the range the device could automatically reconfigure to the default settings or switch off. Alternatively the user could be provided with the option of manually informing the device so that it can reconfigure or switch off.

Figure 4:
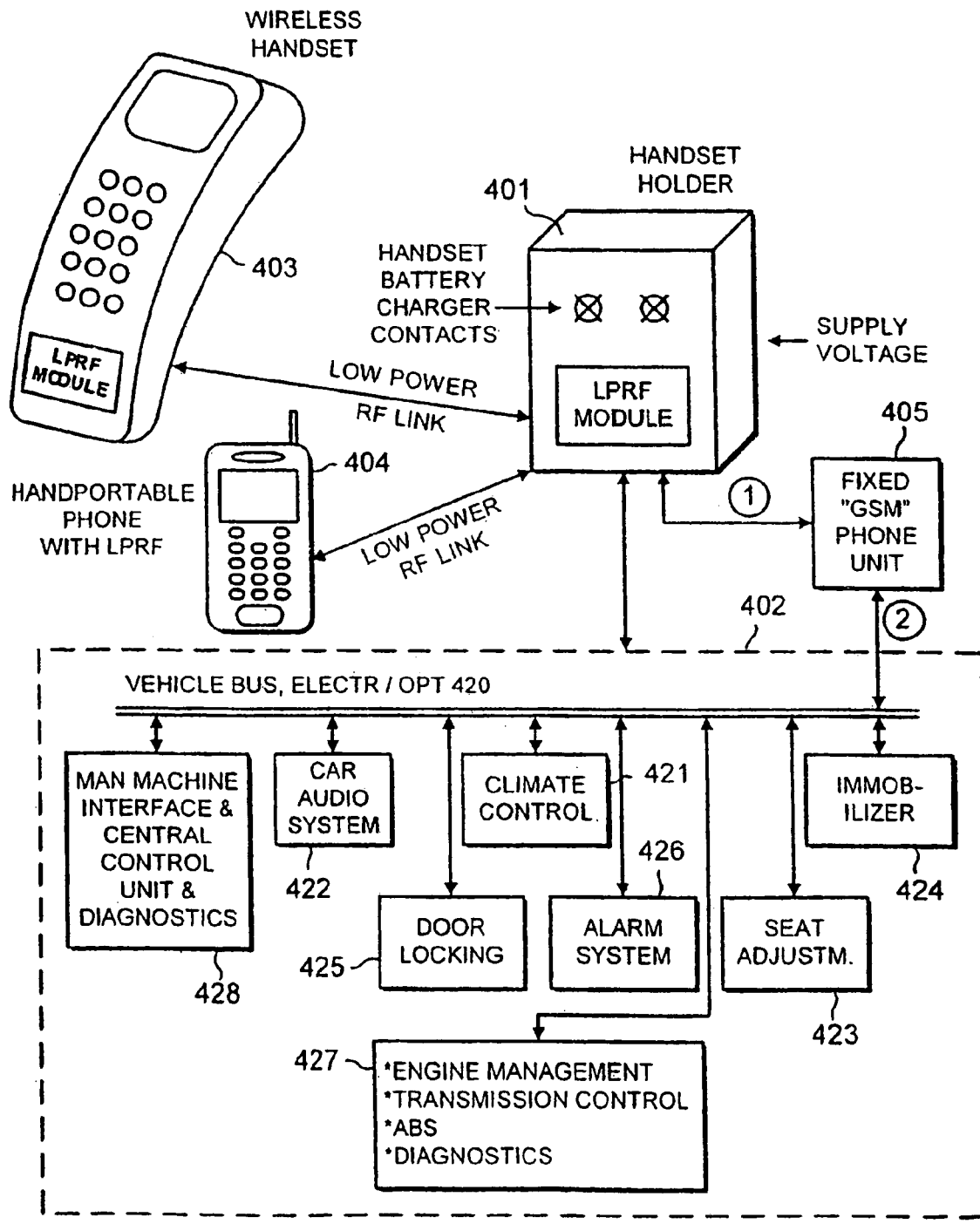
FIG. 4 illustrates a vehicle control system and various portable controllers.

FIG. 4 illustrates the implementation of a vehicle control system according to an embodiment of the present invention. The system comprises a vehicle control system comprising an interface module 401 for interfacing with a portable controller, and a vehicle management system block 402. The interface module 401 is a low power RF module in this embodiment, but may alternatively be a mechanical connector. The vehicle management system block 402 comprises a plurality of devices which may be adjusted according to the portable controller user's preferences, and a vehicle bus 420 which may, for example, electrically or optically connect these devices to the interface module 401. The devices include a climate controller 421, car audio system 422 and seat positioner 423. They also include security control features such as an immobiliser 424, door locking controller 425 and alarm system 426. Finally, this vehicle management system block 402 comprises an engine controller 427 and man machine interface 428 for providing information and diagnostics for vehicle servicing.

The portable controller is implemented in a radiotelephone. In one embodiment a car phone has been modified so that a wireless handset 403 provides the functionality of the controller and a handset holder provides the LPRF interface 401 between the wireless handset and vehicle management system 402.

In another embodiment a handportable radiotelephone 404, such as a conventional GSM phone is provided with an LPRF interface for coupling to the interface module 401. Such a phone is described below with reference to FIG. 6. The LPRF interface may be part of a car phone or a dedicated interface for connection to the vehicle bus 420.

The mobile phone may act as a security device. For example the handportable 404 may ensure that entry or operation of the vehicle or alarm disablement is only possible if the legitimate user enters the LPRF range of the unit 401 with the controller having an entry in its memory corresponding to the exact system ID of the vehicle. In this event, control information is forwarded to the devices 424–426 via the LPRF link and vehicle bus 420 to unlock the doors/boot or disable the immobiliser or alarm. Otherwise, for example, the immobiliser is enabled, doors and/or boot are locked and alarm is enabled.

Alternatively, if the vehicle comprises a car phone and the control is provided by a handportable, the IDs of the phones may be compared. If they match, the appropriate control information is transferred from the controller memory to the vehicle devices.

Figure 5:
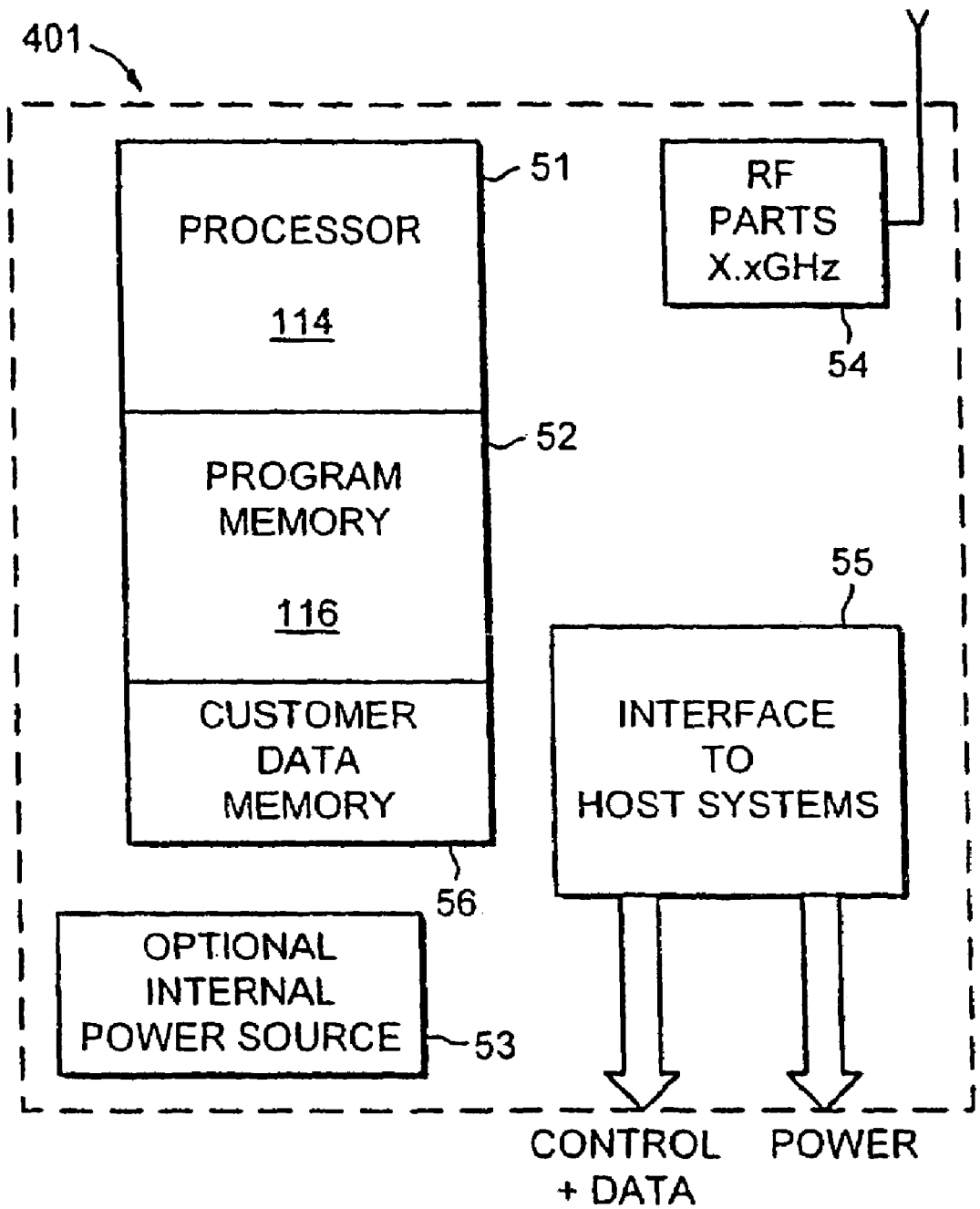
FIG. 5 illustrates a low power RF (LPRF) interface unit for the system and portable controller.
Figure 6:
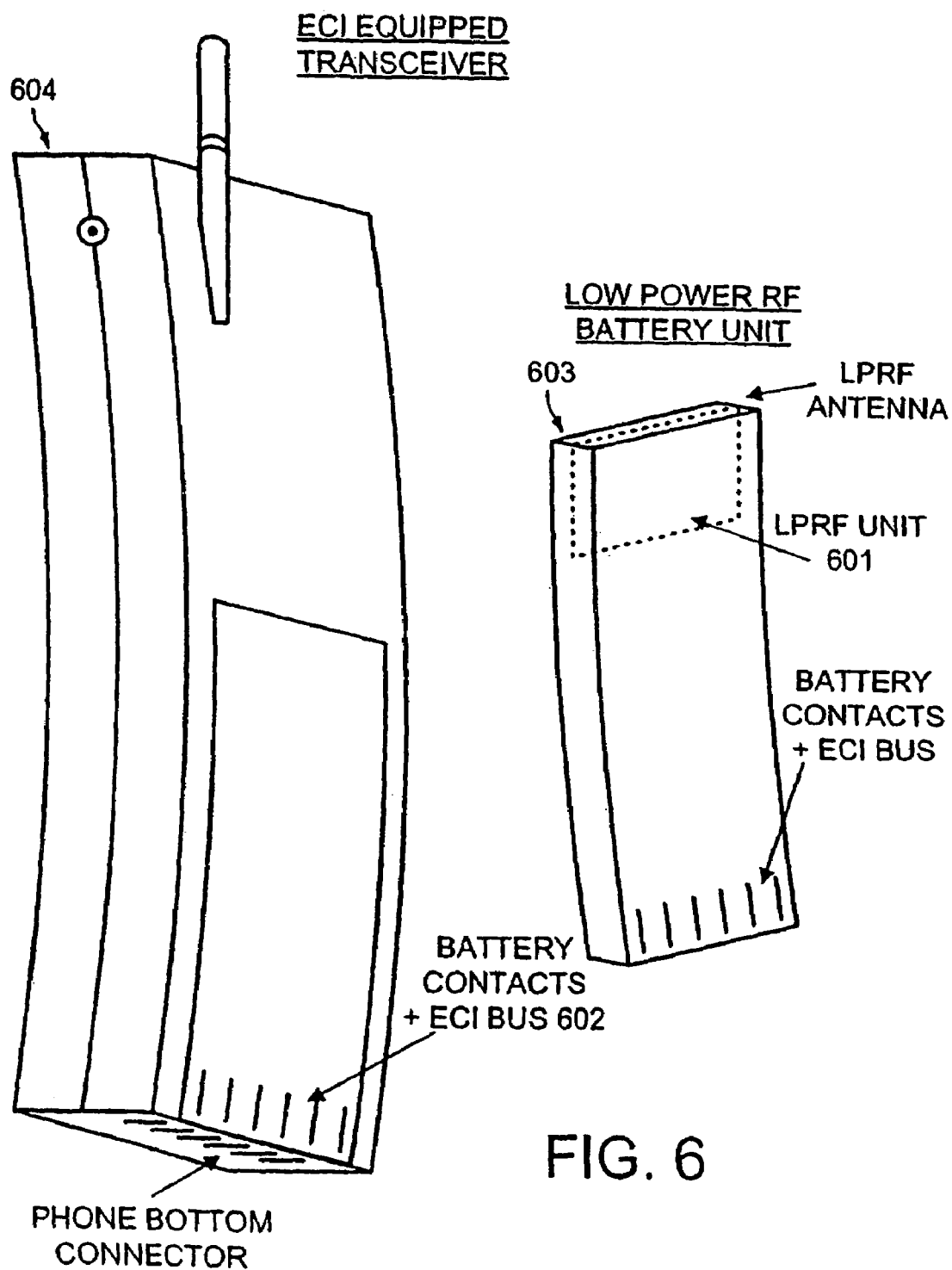
FIG. 6 illustrates a portable controller in the form of a handportable phone according to an embodiment of the present invention.

Turning now to FIGS. 5 and 6, these illustrate the LPRF interface module 401 and mobile phone 404 respectively in more detail.

The LPRF interface module 401 comprises a process 51, program memory 52, customer data memory 56, RF parts 54, optional internal power source 53 and an interface to host systems (such as vehicle devices including the battery for power). The functions of the processor 51, and program memory 52 broadly correspond to those of the processor 114 and 116 of the FIG. 2 embodiment and the interface couples the processor to devices such as those referenced 102 in that embodiment. The device preferably comprises the internal power source 53, so as to prevent drain on the vehicle's battery when the ignition is off. The RF parts 54 comprises a transceiver for communicating with a portable controller by radio. The customer data memory 56 is also preferably provided, to update the memory of an associated mobile phone (e.g. updating the phonebook of the handportable phone 404 when coupled to the RF unit 401).

The handportable phone 404 may be provided with a battery 601 comprising an LPRF battery unit 601, as shown in FIG. 6. In this embodiment, battery contacts of the phone 604 comprise an EC1 bus for connection to the LPRF battery unit 601 of the battery 603 and communication between the portable controller (phone 604) and the vehicle devices is effected by the EC1 bus 602, LPRF link between the LPRF battery unit and interface unit 401, and the vehicle bus 420.

The present invention includes any novel feature or combination of features disclosed herein either explicitly or any generalisation thereof irrespective of whether or not it relates to the claimed invention or mitigates any or all of the problems addressed.

In view of the foregoing description it will be evident to a person skilled in the art that various modifications may be made within the scope of the invention.

What is claimed is:

1. An arrangement for configuring system devices by transferring control information defining a user's preferences from a portable controller to a system, wherein the portable controller comprises:
   memory circuitry arranged to store first control information defining the user's preferences for configuring a first device in association with a first identifier, and second control information defining the user's preferences for configuring a second device in association with a second identifier, and arranged to retrieve the first control information defining the user's preferences for configuring the first device in response to a request including the first identifier, and to retrieve the second control information defining the user's preferences for configuring the second device in response to a request including the second identifier; and
   a radio transceiver operable to transmit and receive on a low power radio frequency bi-directional link in order to transfer to the system the retrieved control information defining the user's preferences for configuring at least one of the system devices; and
   wherein the system comprises:
      a radio transceiver for coupling with the radio transceiver of the portable controller to transmit and receive on the low power radio frequency bi-directional link with the portable controller in order to transfer the retrieved control information defining the user's preferences to the system; and
      control means arranged to configure at least one of the system devices in dependence upon the transferred control information defining the user's preferences.

2. An arrangement as claimed in claim 1, wherein the system comprises a plurality of devices and the control means is arranged to configure the devices in dependence upon transferred control information.

3. An arrangement as claimed in claim 2, wherein the radio transceiver of the controller transfers to the system retrieved control information for the devices of the system, and the control means configures the devices in dependence upon the transferred control information.

4. An arrangement as claimed in claim 3, wherein the memory circuitry stores and retrieves information identifying a particular system and the control information only configures the device or devices of that particular system.

5. An arrangement as claimed in claim 2, wherein the radio transceiver of the controller transfers to the system retrieved control information for a selection of devices of the system defined by the user, and the control means configures the selection of devices in dependence upon the transferred control information.

6. An arrangement as claimed in claim 5, wherein the memory circuitry stores and retrieves information identifying a particular system and the control information only configures the device or devices of that particular system.

7. An arrangement as claimed in claim 2, wherein the memory circuitry stores and retrieves information identifying a particular system and the control information only configures the device or devices of that particular system.

8. An arrangement as claimed in claim 1, wherein the memory circuitry stores and retrieves information identifying a particular system and the control information only configures the device or devices of that particular system.

9. An arrangement as claimed in claim 8, wherein the device or devices are security devices.

10. An arrangement as claimed in claim 1, wherein the system is a vehicle control system.

11. An arrangement as claimed in claim 10, wherein the device or devices are selected from devices including an alarm, an immobiliser, a seat positioner, a mirror positioner, door/boot locks, temperature/ventilation controller, an engine management device, and servicing interface device.

12. An arrangement as claimed in claim 1, wherein the controller is removable from the environment of the system.

13. An arrangement as claimed in claim 1, wherein the controller is a handportable radio device.

14. An arrangement as claimed in claim 1, wherein the device is electronically controlled by the system.

15. An arrangement as claimed in claim 1, wherein the system comprises a processor and memory, wherein the memory stores the transferred information and the processor controls the operation of the device, reconfiguring it in dependence upon the received control information.

16. An arrangement as claimed in claim 1, wherein configuring the device changes the manner in which the device function.

17. An arrangement as claimed in claim 1, wherein the radio transceiver of the portable controller is operable to receive, via the bi-directional link, an identifier from the system and to transmit via the bi-directional link control information retrieved from the memory using the received identifier.

18. An arrangement as claimed in claim 1, wherein the retrieved control information is transferred from the portable controller to the system in response to the portable controller entering the environment of the system.

19. An arrangement as claimed in claim 18, wherein the retrieved control information is transferred automatically in response to the portable controller entering the environment of the system.

20. An arrangement as claimed in claim 1, wherein the portable controller comprises input means for receiving control information defining the user's preferences for configuring the device.

21. An arrangement as claimed in claim 20, wherein the input means is for receiving control information directly from a computer.

22. An arrangement as claimed in claim 1, wherein the portable controller comprises an output for giving information to a user.

23. An arrangement as claimed in claim 1, wherein the portable controller comprises a car phone.

24. A portable controller for storing control information defining a user's preferences for system devices and for configuring system devices by transferring control information defining the user's preferences to a system, the portable controller comprising:
   memory circuitry arranged to store first control information defining the user's preferences for configuring a first device in association with a first identifier, and second control information defining the user's preferences for configuring a second device in association with a second identifier, and arranged to retrieve the first control information defining the user's preferences for configuring the first device in response to a request including the first identifier, and to retrieve the second control information defining the user's preferences for configuring the second device in response to a request including the second identifier; and
   a radio transceiver operable to transmit and receive on a low power radio frequency bi-directional link in order to transfer to the system the retrieved control information defining the user's preferences for configuring at least one of the system devices.

25. A controller as claimed in claim 24, wherein memory circuitry is arranged to store control information for configuring a plurality of devices of the system.

26. A controller as claimed in claim 25, wherein the radio transceiver is arranged to transfer to the system retrieved control information for the devices of the system.

27. A controller as claimed in claim 26, wherein the memory circuitry stores and retrieves information identifying a particular system and only outputs control information corresponding to the device or devices of that particular system.

28. A controller as claimed in claim 26, wherein the controller comprises means for performing a handshaking procedure with the system.

29. A controller as claimed in claim 26, wherein the power to operate said controller is provided by the system to which control information is transferred.

30. A controller as claimed in claim 25, wherein the radio transceiver transfers to the system retrieved control information for a selection of devices of the system defined by the user.

31. A controller as claimed in claim 30, wherein the memory circuitry stores and retrieves information identifying a particular system and only outputs control information corresponding to the device or devices of that particular system.

32. A controller as claimed in claim 30, wherein the controller comprises means for performing a handshaking procedure with the system.

33. A controller as claimed in claim 30, wherein the power to operate said controller is provided by the system to which control information is transferred.

34. A controller as claimed in claim 25, wherein the memory circuitry stores and retrieves information identifying a particular system and only outputs control information corresponding to the device or devices of that particular system.

35. A controller as claimed in claim 25, wherein the controller comprises means for performing a handshaking procedure with the system.

36. A controller as claimed in claim 25, wherein the power to operate said controller is provided by the system to which control information is transferred.

37. A controller as claimed in claim 24, wherein the memory circuitry stores and retrieves information identifying a particular system and only outputs control information corresponding to the device or devices of that particular system.

38. A controller as claimed in claim 37, wherein the memory circuitry comprises a look-up table for associating the identity of the system and its devices with the respective device control information.

39. A controller as claimed in claim 38 wherein the look-up table is arranged to assign portions of memory to each identity.

40. A controller as claimed in claim 39, wherein the controller comprises means for performing a handshaking procedure with the system.

41. A controller as claimed in claim 39, wherein the power to operate said controller is provided by the system to which control information is transferred.

42. A controller as claimed in claim 38, wherein the controller comprises means for performing a handshaking procedure with the system.

43. A controller as claimed in claim 38, wherein the power to operate said controller is provided by the system to which control information is transferred.

44. A controller as claimed in claim 37, wherein the controller comprises means for performing a handshaking procedure with the system.

45. A controller as claimed in claim 37, wherein the power to operate said controller is provided by the system to which control information is transferred.

46. A controller as claimed in claim 24, wherein the controller comprises means for performing a handshaking procedure with the system.

47. A controller as claimed in claim 46, wherein the power to operate said controller is provided by the system to which control information is transferred.

48. A portable controller as claimed in claim 24, wherein the radio transceiver is operable to receive, via the bi-directional link, an identifier from the system and to transmit via the bi-directional link control information retrieved from the memory using the received identifier.

49. A controller as claimed in claim 48, wherein the power to operate said controller is provided by the system to which control information is transferred.

50. A controller as claimed in claim 24, wherein the power to operate said controller is provided by the system to which control information is transferred.

51. A controller as claimed in claim 24, wherein the memory circuitry stores and retrieves information identifying a particular system and only outputs control information corresponding to the device or devices of that particular system.

52. A controller as claimed in claim 24, wherein the controller comprises means for performing a handshaking procedure with the system.

53. A controller as claimed in claim 24, wherein the power to operate said controller is provided by the system to which control information is transferred.

54. A controller as claimed in claim 24, wherein the power to operate said controller is provided by the system to which control information is transferred.

55. A portable controller as defined in claim 24, wherein the portable controller comprises a mobile phone.

56. A method for configuring system devices by transferring control information defining a user's preferences to a system from a portable controller, comprising the steps of:

the portable controller stores first control information defining the user's preferences for configuring a first device in association with a first identifier, and second control information defining the user's preferences for configuring a second device in association with a second identifier;

the portable controller retrieves the first control information defining the user's preferences for configuring the first device, when the portable controller receives a request including the first identifier, and the portable controller retrieves the second control information defining the user's preferences for configuring the second device, when the portable controller receives a request including the second identifier; and the portable controller transmits and receives on a low power radio frequency bi-directional link in order to transfer to the system the retrieved control information defining the user's preferences for configuring at least one of the system devices.

57. A method as claimed in claim 56, wherein the portable controller stores and retrieves information identifying a particular system and only outputs control information corresponding to the device or devices of that particular system.

58. A method as claimed in claim 57, wherein the portable controller maintains a look-up table for associating the identity of the system and its device or devices with the respective device control information.

59. A method as claimed in claim 56, wherein the portable controller receives an identifier from the system via the bi-directional link and transmits control information via the bi-directional link retrieved from the memory using the received identifier.

60. An arrangement for configuring vehicle management system devices by transferring control information defining a user's preferences from a portable controller to a vehicle management system, wherein the portable controller comprises:

memory circuitry arranged to store first control information defining the user's preferences for configuring a first device in association with a first identifier, and second control information defining the user's preferences for configuring a second device in association with a second identifier, and arranged to retrieve the first control information defining the user's preferences for configuring the first device in response to a request including the first identifier, and to retrieve the second control information defining the user's preferences for configuring the second device in response to a request including the second identifier; and output means for transferring to the vehicle management system the retrieved control information defining the user's preferences for configuring at least one of the vehicle management system devices; and wherein the vehicle management system comprises:

means for coupling with the output means of the portable controller to transfer the retrieved control information defining the user's preferences to the vehicle management system; and control means arranged to configure at least one of the vehicle management system devices in dependence upon the transferred control information defining the user's preferences.

61. A portable controller for storing control information defining a user's preferences for vehicle management system devices and for configuring vehicle management system devices by transferring control information defining the user's preferences to a vehicle management system, the portable controller comprising:

memory circuitry arranged to store first control information defining the user's preferences for configuring a first device in association with a first identifier, and second control information defining the user's preferences for configuring a second device in association with a second identifier, and arranged to retrieve the first control information defining the user's preferences for configuring the first device in response to a request including the first identifier, and to retrieve the second control information defining the user's preferences for configuring the second device in response to a request including the second identifier; and output means for transferring to the vehicle management system the retrieved control information defining the user's preferences for configuring at least one of the vehicle management system devices.

* * * * *